US012560838B2

(12) United States Patent
Matsushima

(10) Patent No.: US 12,560,838 B2
(45) Date of Patent: Feb. 24, 2026

(54) DISPLAY DEVICE AND VEHICLE-USE DISPLAY DEVICE

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/740,516

(22) Filed: May 10, 2022

(65) Prior Publication Data

US 2022/0269128 A1 Aug. 25, 2022

Related U.S. Application Data

(63) Continuation of application No. PCT/JP2020/031679, filed on Aug. 21, 2020.

(30) Foreign Application Priority Data

Nov. 14, 2019 (JP) ................................. 2019-206161

(51) Int. Cl.
*G02F 1/1335* (2006.01)
*B60K 35/22* (2024.01)
(Continued)

(52) U.S. Cl.
CPC ........ *G02F 1/133531* (2021.01); *B60K 35/22* (2024.01); *B60K 35/60* (2024.01); (Continued)

(58) Field of Classification Search
CPC ... G02F 1/1347; G02F 1/13471; G02F 1/1323
See application file for complete search history.

(56) References Cited

U.S. PATENT DOCUMENTS

2004/0252258 A1* 12/2004 Matsushima ....... G02F 1/13471
349/96
2006/0203165 A1† 9/2006 Shibazaki
(Continued)

FOREIGN PATENT DOCUMENTS

JP      2004-133334 A      4/2004
JP      2006-195388 A      7/2006
(Continued)

OTHER PUBLICATIONS

International Search Report mailed on Nov. 10, 2020, for the corresponding PCT Application No. PCT/JP2020/031679, with English machine translation.
(Continued)

*Primary Examiner* — Jessica M Merlin
(74) *Attorney, Agent, or Firm* — Michael Best & Friedrich LLP

(57) ABSTRACT

According to one embodiment, a display device including a display panel, a viewing angle control panel and a polarizing axis rotation element, wherein the display panel includes a first liquid crystal layer which modulates a first polarization component, the viewing angle control panel includes a second liquid crystal layer containing twist-aligned liquid crystal molecules, a second polarizing axis of a second polarization component transmitted through the viewing angle control panel is different from a first polarizing axis of the first polarization component, and the polarizing axis rotates element rotating the second polarizing axis such that the second polarizing axis is aligned with the first polarizing axis.

8 Claims, 14 Drawing Sheets

DSP

| POL1 |
| :---: |
| PNL |
| POL2 |
| 100 |
| POL3 |
| 1 |
| POL4 |
| IL |

(51) Int. Cl.

| | | |
|---|---|---|
| B60K 35/60 | (2024.01) | |
| B60K 35/81 | (2024.01) | |
| G02F 1/13 | (2006.01) | |
| G02F 1/13363 | (2006.01) | |
| G02F 1/1343 | (2006.01) | |
| G02F 1/1347 | (2006.01) | |

(52) U.S. Cl.

CPC ............ B60K 35/81 (2024.01); G02F 1/1323 (2013.01); G02F 1/133636 (2013.01); G02F 1/134309 (2013.01); G02F 1/13471 (2013.01)

(56) References Cited

U.S. PATENT DOCUMENTS

| | | | |
|---|---|---|---|
| 2009/0174843 A1 † | 7/2009 | Sakai | |
| 2010/0103148 A1 * | 4/2010 | Okazaki | G09G 3/3648 |
| | | | 345/204 |
| 2011/0310085 A1 | 12/2011 | Mimura et al. | |
| 2016/0097943 A1 † | 4/2016 | Mimura | |
| 2018/0052342 A1 * | 2/2018 | Chang | G02F 1/134363 |
| 2018/0113334 A1 | 4/2018 | Fang et al. | |
| 2018/0321523 A1 * | 11/2018 | Robinson | G02F 1/13363 |
| 2018/0364405 A1 | 12/2018 | Chen et al. | |
| 2019/0025624 A1 * | 1/2019 | Petelin | C09K 19/0208 |
| 2019/0121173 A1 * | 4/2019 | Robinson | G02F 1/13363 |
| 2019/0353943 A1 * | 11/2019 | Smith | G02F 1/133528 |
| 2020/0064666 A1 * | 2/2020 | Xin | G02F 1/1347 |

FOREIGN PATENT DOCUMENTS

| | | | | |
|---|---|---|---|---|
| JP | 2006208605 A | † | 8/2006 | |
| JP | 2006209021 A | † | 8/2006 | |
| JP | 2020-118965 A | | 8/2020 | |
| WO | 2005073790 A1 | † | 8/2005 | |
| WO | 2008/133043 A1 | | 11/2008 | |

OTHER PUBLICATIONS

Japanese Office Action dated Sep. 12, 2023, for the corresponding Japanese Application No. 2019-206161, with English machine translation.

Japanese Notice of Submissions of Publications etc. dated Jul. 4, 2023 for the corresponding Japanese Application No. 2019-20616.

Chinese Office Action dated Aug. 9, 2023, for the corresponding Chinese Application No. 202080079661.1, with English machine translation.

Chinese Decision of Rejection mailed on May 1, 2024 for the corresponding Chinese Application No. 202080079661.1.

\* cited by examiner

† cited by third party

DSP

| |
|---|
| POL1 |
| PNL |
| POL2 |
| 100 |
| POL3 |
| 1 |
| POL4 |
| IL |

F I G. 1

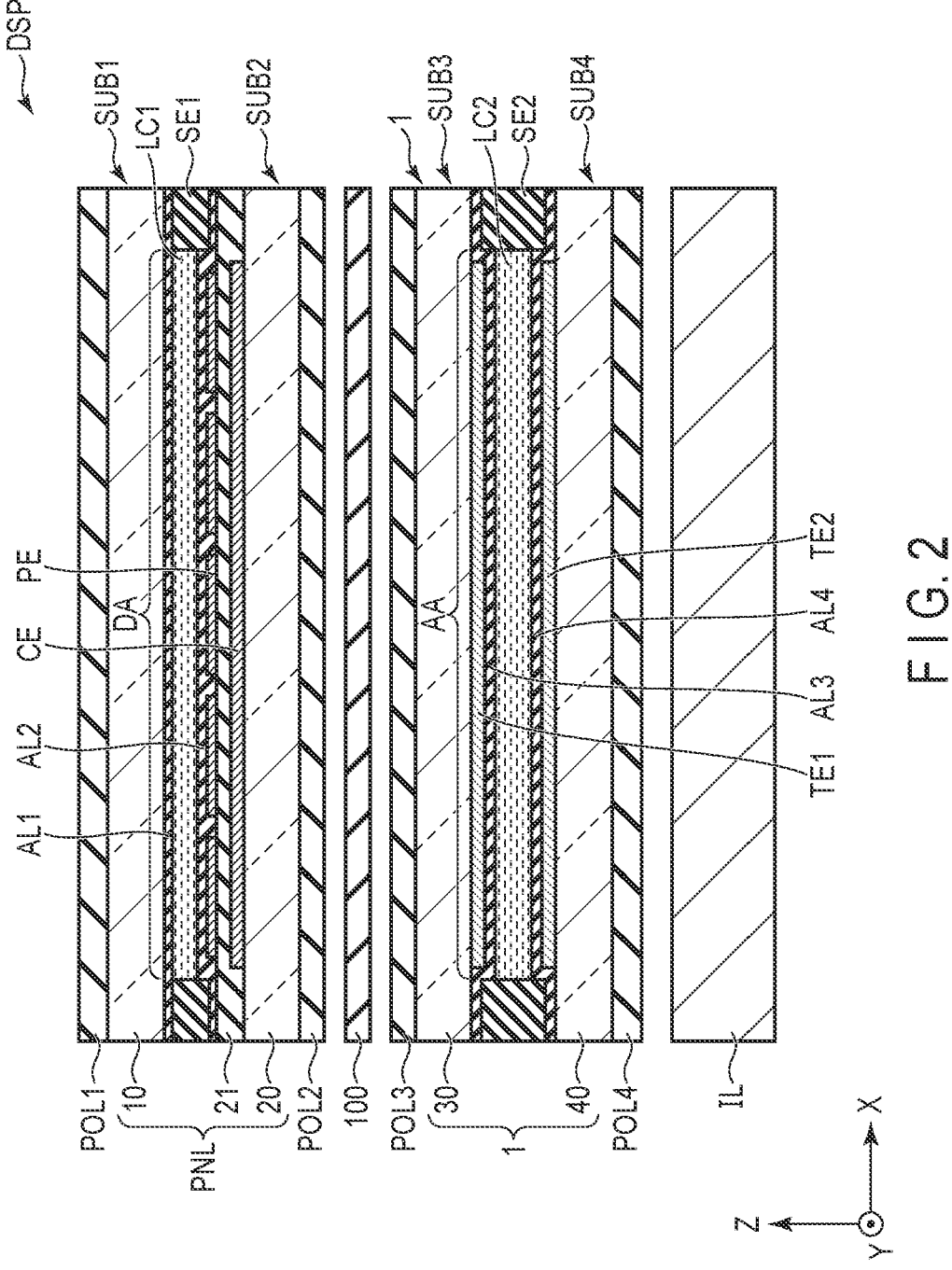
F I G. 2

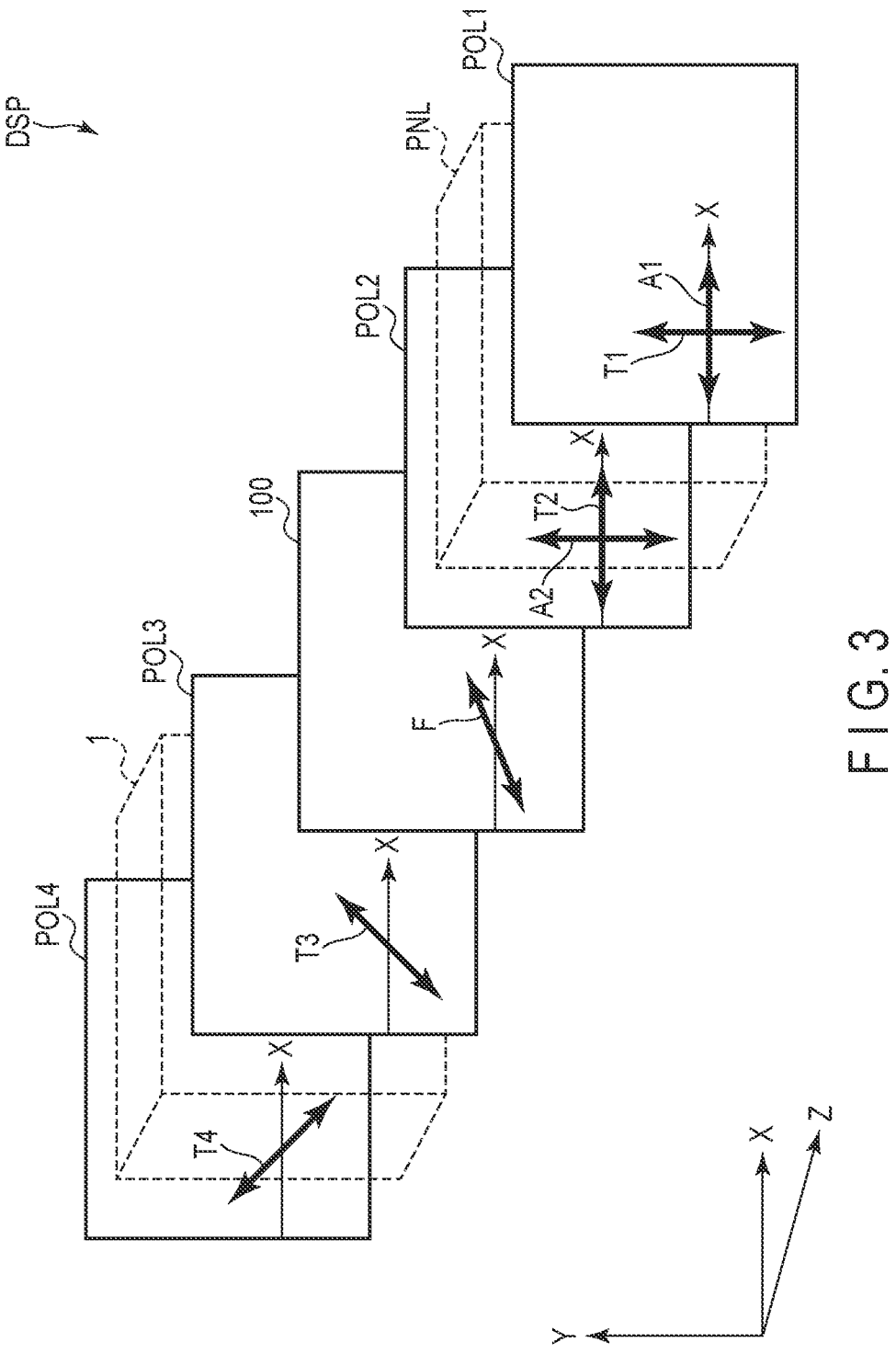
F I G. 3

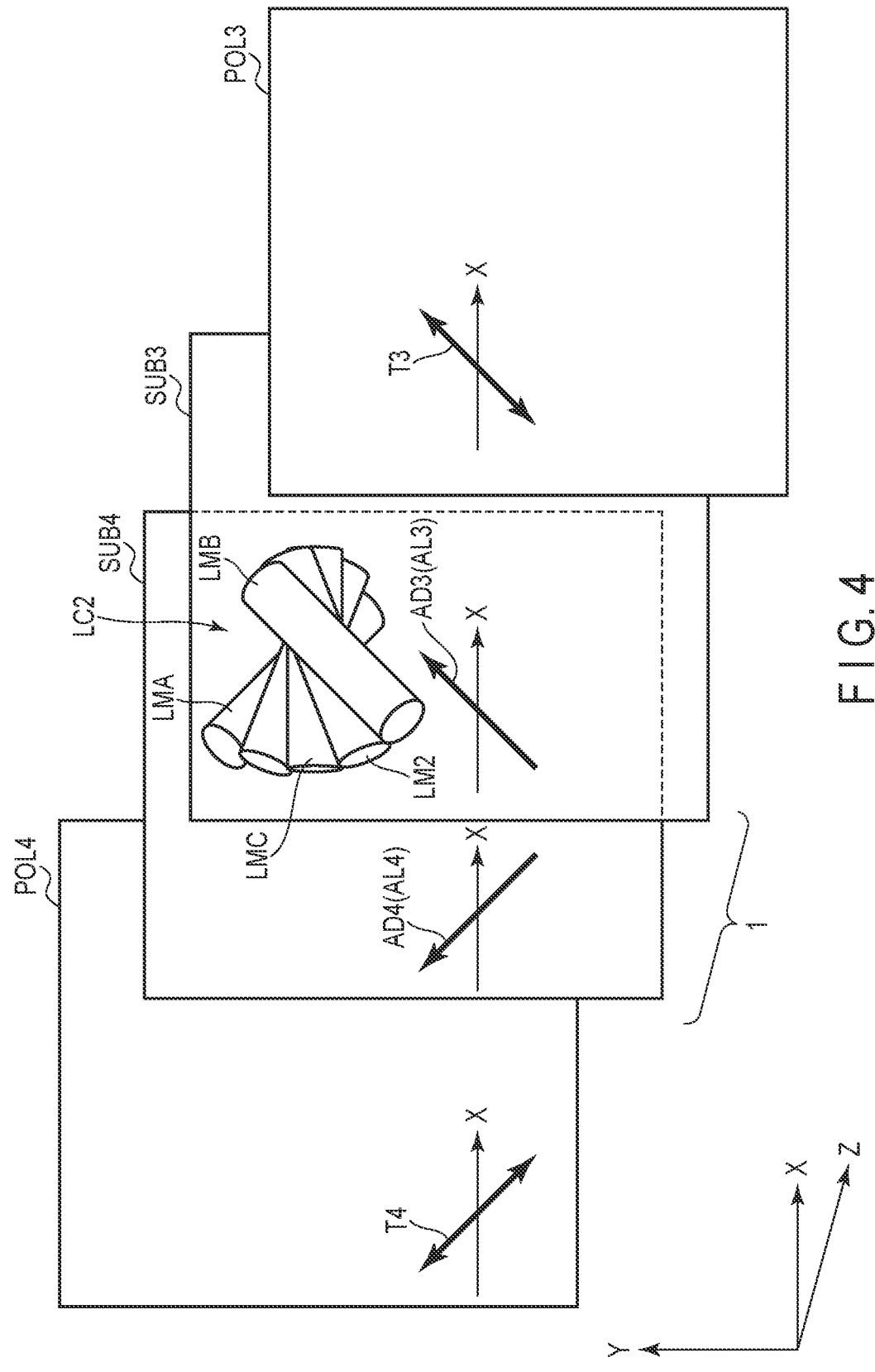
F I G. 4

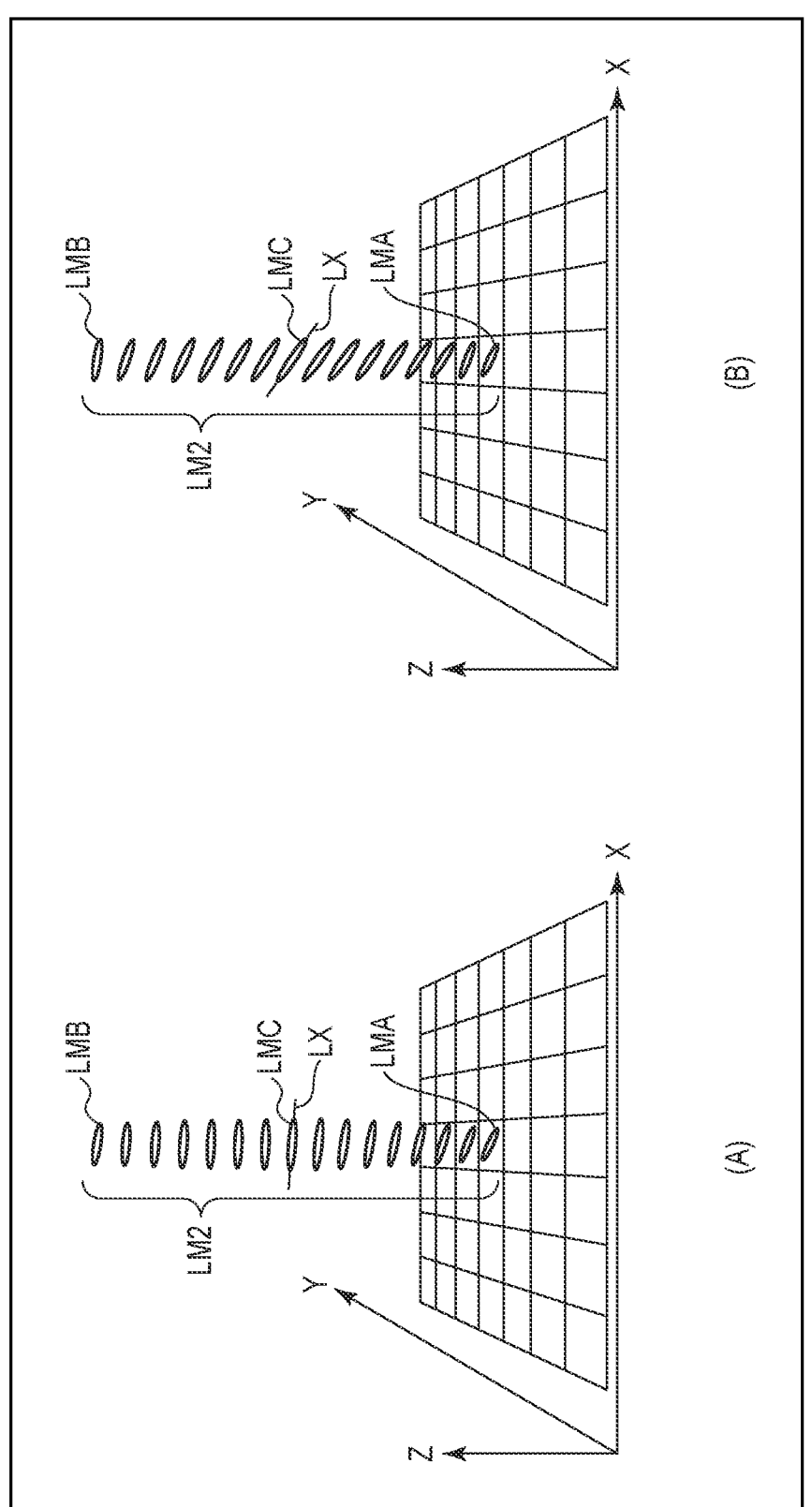
F I G. 5

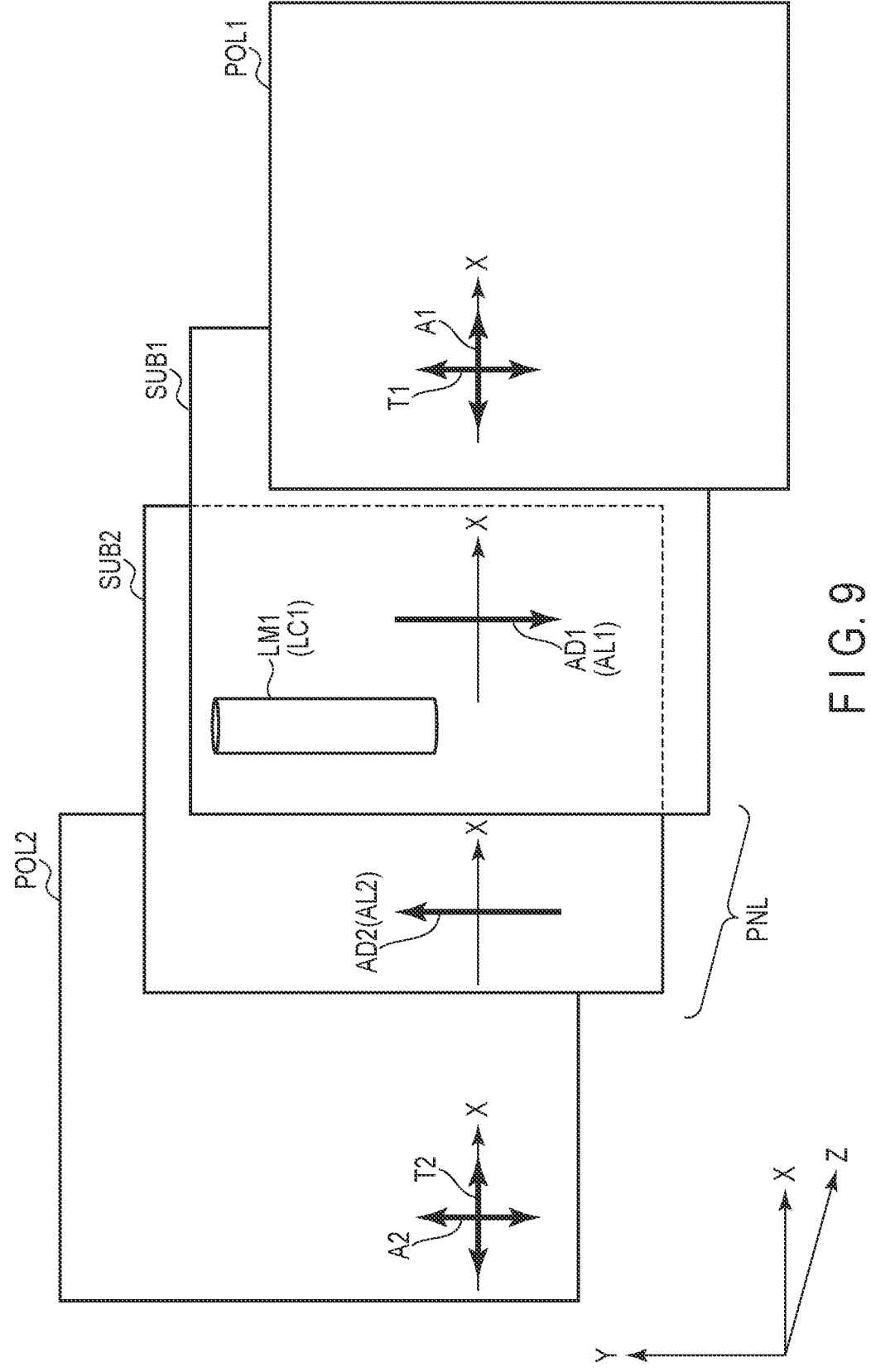
F I G. 9

DSP

| |
|---|
| POL1 |
| PNL |
| 100 |
| 1 |
| POL4 |
| IL |

FIG. 10

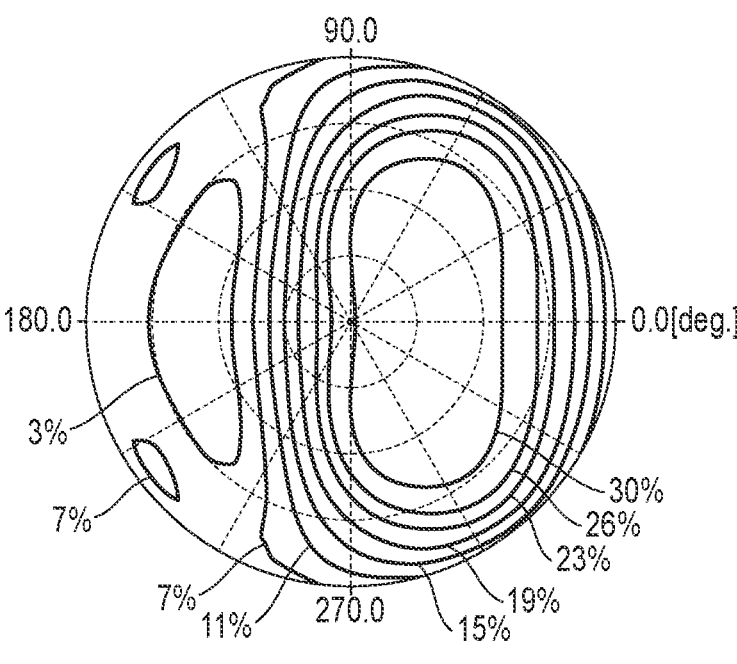
F I G. 11
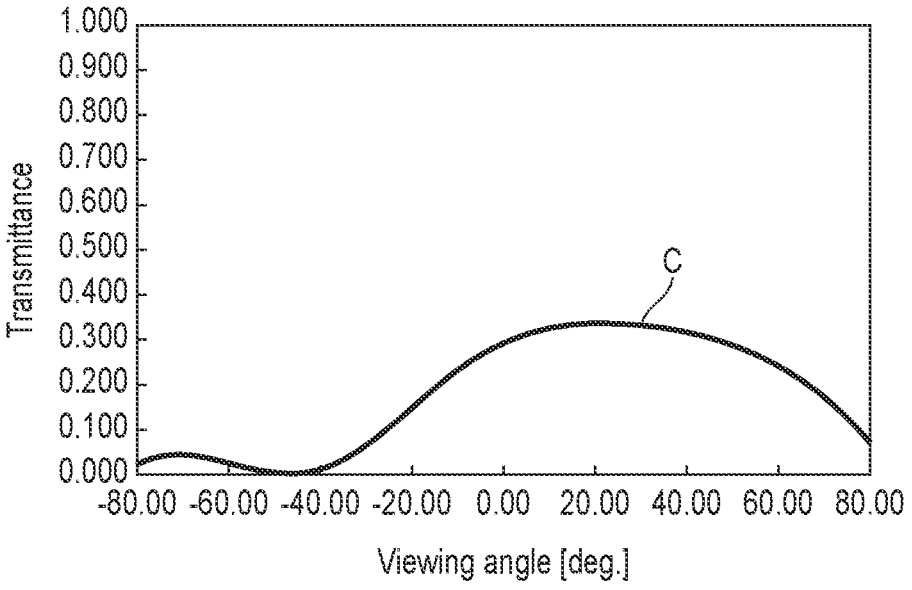
F I G. 12

DSP
| |
|---|
| POL1 |
| PNL |
| POL2 |
| 100 |
| POL3 |
| 1 |
| POL4 |
| POL5 |
| 2 |
| POL6 |
| IL |
F I G. 13

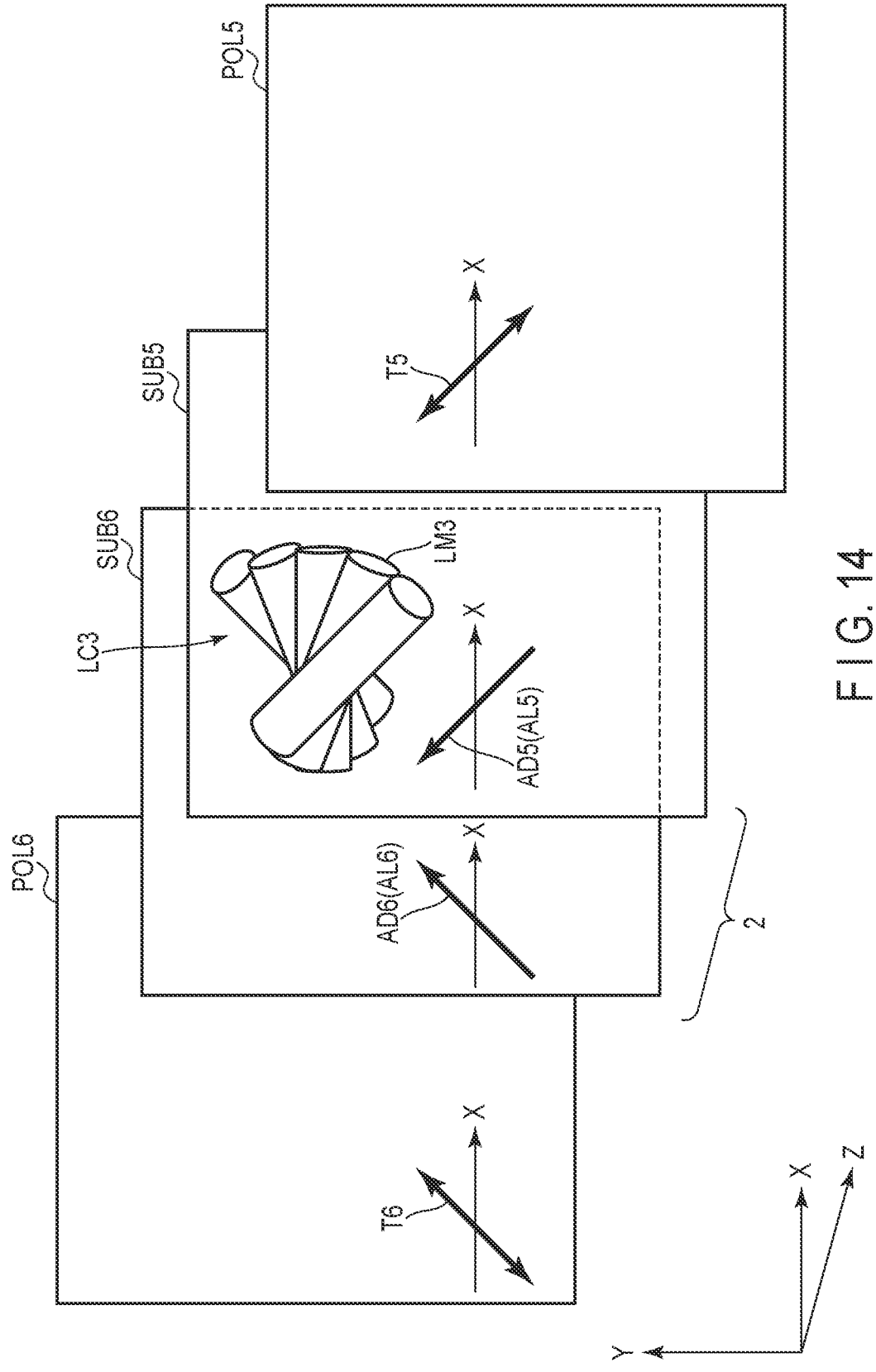
F I G. 14

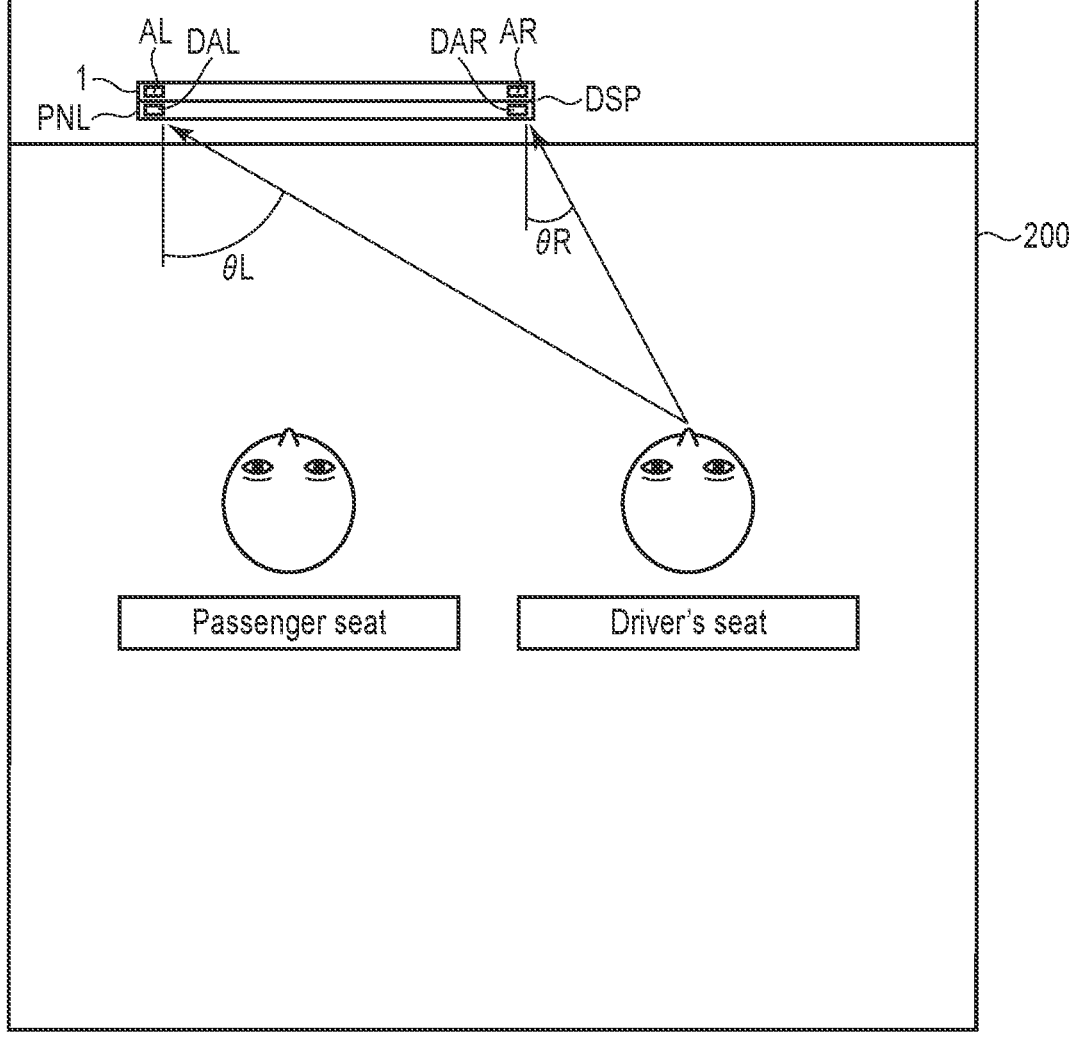
F I G. 15

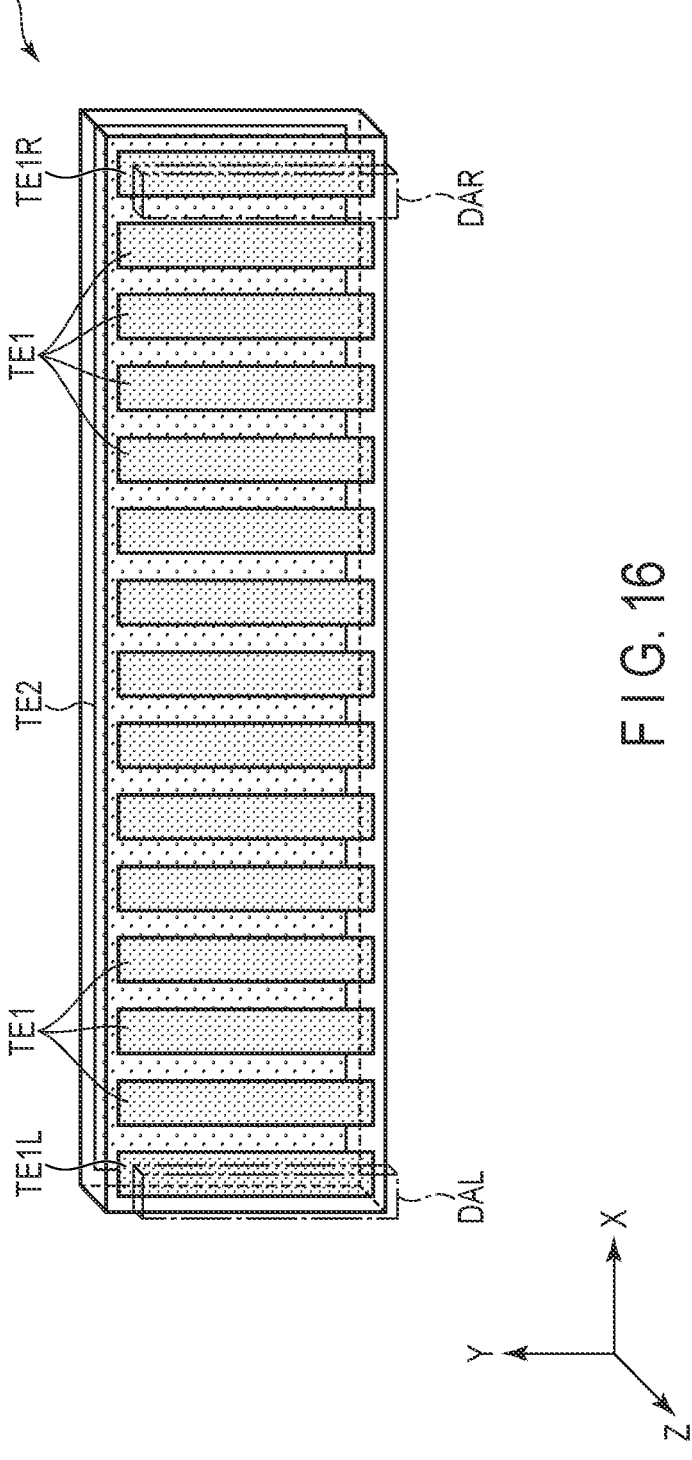
F I G. 16

DISPLAY DEVICE AND VEHICLE-USE DISPLAY DEVICE

CROSS-REFERENCE TO RELATED APPLICATIONS

This application is a Continuation Application of PCT Application No. PCT/JP2020/031679, filed Aug. 21, 2020 and based upon and claiming the benefit of priority from Japanese Patent Application No. 2019-206161, filed Nov. 14, 2019, the entire contents of all of which are incorporated herein by reference.

FIELD

Embodiments described herein relate generally to a display device and a vehicle-use display device.

BACKGROUND

In recent years, there has been a demand for display devices to vary the viewing angle by which a predetermined contrast ratio is achieved. For example, for display devices installed in vehicles such as cars, viewing angle control is required by which a displayed image is recognizable from a passenger seat side but unrecognizable from a driver's seat side during, for example, driving.

For the purpose of controlling such a viewing angle, some techniques using twisted nematic liquid crystal elements have been proposed.

BRIEF DESCRIPTION OF THE DRAWINGS

FIG. 1 is a diagram illustrating a structural example of a display device DSP of an embodiment.

FIG. 2 is a cross-sectional view illustrating a structural example of the display device DSP of FIG. 1.

FIG. 3 is a diagram illustrating axis angles of each optical element of the display device DSP.

FIG. 4 is a diagram illustrating a structural example of a viewing angle control panel 1.

FIG. 5 is a diagram illustrating an alignment state of liquid crystal molecules LM2.

FIG. 9 is a diagram illustrating a structural example of the display panel PNL.

FIG. 10 is a diagram illustrating another structural example of the display device DSP of the embodiment.

FIG. 11 is a diagram illustrating viewing angle characteristics of the viewing angle control panel 1 in the on time of the display device DSP of FIG. 10.

FIG. 12 is a diagram illustrating viewing angle characteristics of on/off time of the viewing angle control panel 1.

FIG. 13 is a diagram illustrating another structural example of the display device DSP of the embodiment.

FIG. 14 is a diagram illustrating a structural example of a viewing angle control panel 2.

FIG. 15 is a diagram illustrating an application example of the display device DSP.

FIG. 16 is a diagram illustrating a structural example of the viewing angle control panel 1 applicable to the display device DSP of FIG. 15.

DETAILED DESCRIPTION

Figure 6:
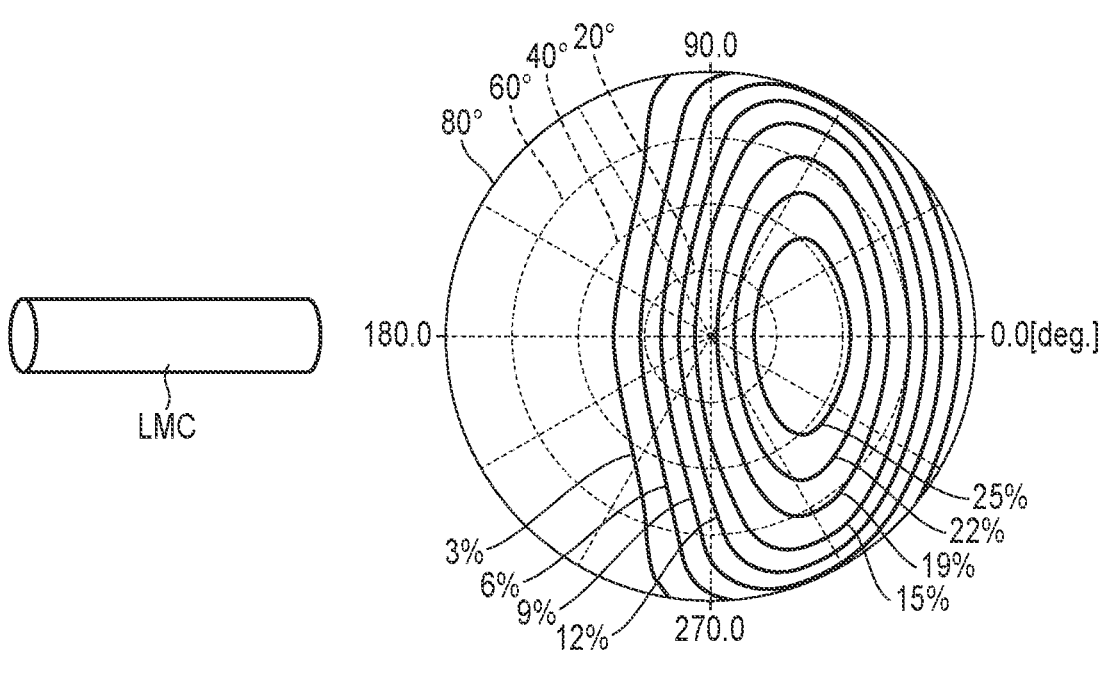
FIG. 6 is a diagram illustrating viewing angle characteristics of the viewing angle control panel 1 in the alignment state of part (B) of FIG. 5.

In general, according to one embodiment, a display device comprising, a display panel, a viewing angle control panel, and a polarizing axis rotation element disposed between the viewing angle control panel and the display panel, wherein the display panel includes a first liquid crystal layer which modulates a first polarization component, the viewing angle control panel includes a second liquid crystal layer containing twist-aligned liquid crystal molecules, a second polarizing axis of a second polarization component transmitted through the viewing angle control panel is different from a first polarizing axis of the first polarization component, and the polarizing axis rotates element rotating the second polarizing axis such that the second polarizing axis is aligned with the first polarizing axis.

According to another embodiment, a vehicle-use display device arranged in front of a passenger seat comprising a display panel, a viewing angle control panel, and a polarizing axis rotation element disposed between the viewing angle control panel and the display panel, wherein the display panel includes a first liquid crystal layer which modulates a first polarization component, a driver's seat and the passenger seat are aligned in a first direction, the viewing angle control panel includes a second liquid crystal layer containing twist-aligned liquid crystal molecules, those of the liquid crystal molecules located in an approximate center of the second liquid crystal layer along a thickness direction thereof are aligned such that the long axis thereof is along the first direction, a second polarizing axis of a second polarization component transmitted through the viewing angle control panel is different from a first polarizing axis of the first polarization component, and the polarizing axis rotation element rotates the second polarizing axis such that the second polarizing axis is aligned with the first polarizing axis.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Figure 1:
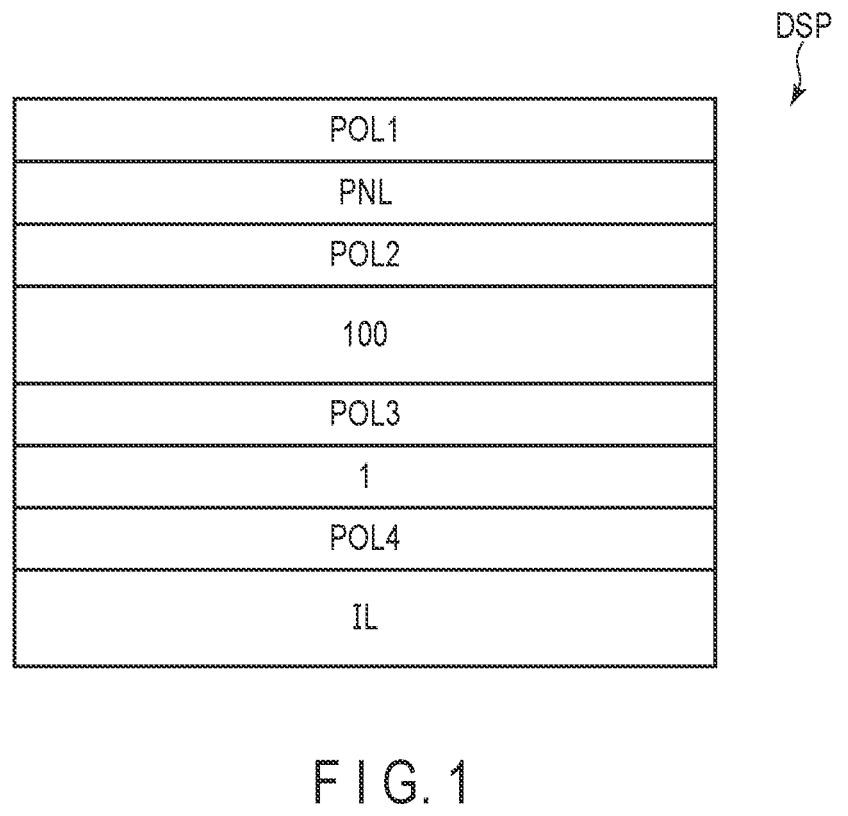

FIG. 1 is a diagram illustrating a structural example of a display device DSP of an embodiment.

The display device DSP includes an illumination device IL, a viewing angle control panel 1, a polarizing axis rotation element 100, a display panel PNL, and first to fourth polarizers POL1 to POL4. The polarizing axis rotation element 100 is disposed between the viewing angle control panel 1 and the display panel PNL. The viewing angle control panel 1 is disposed between the illumination device IL and the polarizing axis rotation element 100. The first polarizer POL1 is disposed in the front side of the display panel PNL (or in the observation position side where the display device DSP is observed). The second polarizer POL2 is disposed between the polarizing axis rotation element 100 and the display panel PNL. The third polarizer POL3 is disposed between the viewing angle control panel 1 and the polarizing axis rotation element 100. The fourth polarizer POL4 is disposed in the rear side of the viewing angle control panel 1 (or between the illumination device IL and the viewing angle control panel 1).

FIG. 2 is a cross-sectional view illustrating a structural example of the display device DSP of FIG. 1. First direction X, second direction Y, and third direction Z shown here are orthogonal to each other. They may intersect each other at an angle other than 90°. The first and second directions X and Y correspond to, for example, directions parallel to the substrate contained in the display device DSP, and the third direction Z corresponds to the direction of thickness of the display device DSP.

The display panel PNL is, for example, a liquid crystal panel including a first substrate SUB1, a second substrate SUB2, and a first liquid crystal layer LC1. The first liquid crystal layer LC1 is held between the first substrate SUB1 and the second substrate SUB2, and sealed by a seal SE1. The display panel PNL described here, as an example, controls the alignment state of liquid crystal molecules by an electric field along the substrate main surface. Note that the display panel PNL in this embodiment is not limited to the example shown in the figure, but may be used to control the alignment state of liquid crystal molecules by an electric field along the normal of the substrate main surface. The substrate main surface here corresponds to the X-Y plane defined by the first direction X and the second direction Y.

The first substrate SUB1 is located on the front surface side of the second substrate SUB2. The first substrate SUB1 includes an insulating substrate 10, and an alignment film AL1. The alignment film AL1 is in contact with the first liquid crystal layer LC1. The second substrate SUB2 includes an insulating substrate 20, an insulating film 21, a common electrode CE, a plurality of pixel electrodes PE, and an alignment film AL2. The common electrode CE is provided between the insulating substrate 20 and the insulating film 21. The pixel electrodes PE are disposed between the insulating film 21 and the alignment film AL2. In the display area DA where images are displayed, the pixel electrodes PE are overlapped with one common electrode CE via the insulating film 21. The pixel electrode PE and the common electrode CE are controlled to apply voltage to the first liquid crystal layer LC1. The alignment film AL2 is in contact with the first liquid crystal layer LC1.

Although only the main parts of the display panel PNL are simplified and illustrated here, the first substrate SUB1 further includes, for example, a light-shielding layer, a color filter layer, an overcoat layer, and spacers. The second substrate SUB2 includes, for example, a plurality of scanning lines, a plurality of signal lines, and switching elements electrically connected to each pixel electrode PE, and various insulating films.

The viewing angle control panel 1 is a liquid crystal panel, for example, and includes a third substrate SUB3, a fourth substrate SUB4, and a second liquid crystal layer LC2. The second liquid crystal layer LC2 is held between the third substrate SUB3 and the fourth substrate SUB4, and sealed by a seal SE2. The second liquid crystal layer LC2 contains twist-aligned liquid crystal molecules, as described later.

The third substrate SUB3 is located in the front surface side of the fourth substrate SUB4. The third substrate SUB3 includes an insulating substrate 30, a first transparent electrode TE1, and an alignment film AL3. The first transparent electrode TE1 is, in the effective area AA to control the viewing angle, disposed between the insulating substrate 30 and the alignment film AL3. The alignment film AL3 is in contact with the second liquid crystal layer LC2. The fourth substrate SUB4 includes an insulating substrate 40, a second transparent electrode TE2, and an alignment film AL4. The second transparent electrode TE2 is, in the effective area AA, disposed between the insulating substrate 40 and the alignment film AL4. The alignment film AL4 is in contact with the second liquid crystal layer LC2. The second liquid crystal layer LC2 has a rotation ability to rotate the polarizing axis of the polarization component, which is linearly polarized light, as described later.

The first transparent electrode TE1 overlaps with the second transparent electrode TE2 via the second liquid crystal layer LC2. The first transparent electrode TE1 and the second transparent electrode TE2 are controlled to apply voltage to the second liquid crystal layer LC2. Each of the first transparent electrode TE1 and the second transparent electrode TE2 is a single sheet-like electrode, or may be divided into multiple electrodes along at least one of the first direction X and the second direction Y.

Focusing on the relationship between the display panel PNL and the viewing angle control panel 1, the first liquid crystal layer LC1 overlaps with the second liquid crystal layer LC2, and the display area DA overlaps with the effective area AA, and the pixel electrodes PE overlap with the first transparent electrode TE1 and the second transparent electrode TE2.

Insulating substrates 10, 20, 30, 40 are transparent substrates, for example, such as glass or resin substrates. For example, insulating substrates 10 and 20 may be glass substrates, and insulating substrates 30 and 40 may be resin substrates. Furthermore, the insulating substrates 10 and 40 may be glass substrates and the insulating substrates 20 and 30 may be resin substrates.

The common electrode CE, the pixel electrode PE, the first transparent electrode TE1, and the second transparent electrode TE2 are transparent electrodes formed of a transparent conductive material such as indium tin oxide (ITO) or indium zinc oxide (IZO). The alignment films AL1 to AL4 are horizontal alignment films with an alignment restriction force which is substantially parallel to the X-Y plane.

The first polarizer POL1 is adhered to the insulating substrate 10, the second polarizer POL2 is adhered to the insulating substrate 20, and the third polarizer POL3 is adhered to the insulating substrate 30, and the fourth polarizer POL4 is adhered to the insulating substrate 40.

In such a display device DSP, the illumination light (natural light) emitted from the illumination device IL travels along the third direction Z through the viewing angle control panel 1, and then illuminates the display panel PNL.

Specifically, the display panel PNL is illuminated by first polarization component transmitted through the second polarizer POL2, and the first polarization component is modulated in the first liquid crystal layer LC1.

When the illumination light emitted from the illumination device IL is natural light, the polarization component transmitted through the fourth polarizer POL4 passes through the viewing angle control panel 1. The second liquid crystal layer LC2 of the viewing angle control panel 1 rotates the polarizing axis of the polarization component transmitted through the fourth polarizer POL4, and transmits the second polarization component.

The second polarization component transmitted through the viewing angle control panel 1 is different from the first polarization component. For example, each of the first polarization component and the second polarization component is linearly polarized light with a polarizing axis in the X-Y plane. In the X-Y plane, the first polarization component includes a first polarizing axis at azimuth forming a predetermined angle with respect to the first direction X, and the second polarization component includes a second polarizing axis at azimuth different from that of the first polarizing axis with respect to the first direction X.

The polarizing axis rotation element 100 is used to rotate the polarizing axis of light from the viewing angle control panel 1 to the display panel PNL. For example, the polarizing axis rotation element 100 is an optical sheet (retardation film) configured to apply a ½ wavelength phase difference to the linearly polarized light transmitted through it. The polarizing axis rotation element 100 may be a single optical sheet or a multilayered optical sheet. The polarizing axis rotation element 100 may be any element which can achieve a function to rotate the polarizing axis, and is not limited to an optical sheet but may be an element with rotation ability such as a twisted nematic liquid crystal element or the like.

In such a polarizing axis rotation element 100, the second polarizing axis of the polarization component transmitted through the viewing angle control panel 1 rotates to align with the first polarizing axis. Therefore, the absorption of the illumination light transmitted through the viewing angle control panel 1 by the second polarizer POL2 is suppressed, and this can suppress the decrease in luminance of the illumination light reaching the display panel PNL.

FIG. 3 is a diagram illustrating axis angles of each optical element of the display device DSP. In this example, in the X-Y plane, the first direction X (X-axis) is a reference azimuth, and the counterclockwise angle with respect to the first direction X is a positive angle.

The first polarizer POL1 has a first absorption axis A1 and a first transmission axis T1 which are substantially orthogonal to each other. The second polarizer POL2 has a second absorption axis A2 and a second transmission axis T2 which are substantially orthogonal to each other. The polarizing axis rotation element 100 has a phase advance axis F. The third polarizer POL3 has a third transmission axis T3. The fourth polarizer POL4 has a fourth transmission axis T4.

Although this is not shown in the figure, the slow phase axis of the polarizing axis rotation element 100 is substantially orthogonal to the phase advance axis F in the X-Y plane. Furthermore, the absorption axis of the third polarizer POL3 is approximately orthogonal to the third transmission axis T3, and the absorption axis of the fourth polarizer POL4 is substantially orthogonal to the fourth transmission axis T4.

The first absorption axis A1 is approximately parallel to the first direction X, and is located at 0° azimuth. The first transmission axis T1 is located at 90° azimuth. The second absorption axis A2 is approximately orthogonal to the first absorption axis A1 and is located at 90° azimuth. The second transmission axis T2 is substantially orthogonal to the first transmission axis T1 and is located at 0° azimuth. The third transmission axis T3 is located at 45° azimuth. The fourth transmission axis T4 is substantially orthogonal to the third transmission axis T3 and is located at 135° azimuth. As shown above, the second transmission axis T2 is different from the azimuth of the third transmission axis T3.

In such a display device DSP, when light travels along the third direction Z, the linearly polarized light transmitted through the fourth polarizer POL4 has the polarizing axis along the fourth transmission axis T4, and the linearly polarized light (second polarization component) transmitted through the third polarizer POL3 via the viewing angle control panel 1 has a second polarizing axis along the third transmission axis T3. That is, the second polarizing axis is located at 45° azimuth to the x-axis. The linearly polarized light (first polarization component) transmitted through the second polarizer POL2 has a first polarizing axis along the second transmission axis T2. That is, the first polarizing axis is located at 0° azimuth (in the x-axis direction).

The phase advance axis F of the polarizing axis rotation element 100 is located in the middle azimuth between the azimuth of the first polarizing axis and the azimuth of the second polarizing axis. Or, the phase advance axis F is located in the middle azimuth between the third transmission axis T3 and the second transmission axis T2. In other words, the phase advance axis F is located at 22.5° azimuth. The polarizing axis rotation element 100 corresponds to a half-wave retardation film as described above, and thus, if the polarizing axis of the incident light is located at θ° azimuth with respect to the phase advance axis, it has a function to rotate the polarizing axis by 2*θ°. Therefore, when the second polarization component transmitted through the third polarizer POL3 passes through the polarizing axis rotation element 100, the second polarizing axis is rotated to align with the first polarizing axis. In other words, the second polarization component is converted into the first polarization component in the polarizing axis rotation element 100. The first polarization component transmitted through the polarizing axis rotation element 100 is almost completely unabsorbed by the second polarizer POL2 and illuminates the display panel PNL.

The first polarization component that illuminates the display panel PNL is arbitrarily modulated by the first liquid crystal layer LC1, and at least a portion thereof is transmitted through first polarizer POL1. The linearly polarized light transmitted through the polarizer POL1 has the polarizing axis along the first transmission axis T1. That is, the polarizing axis of the linearly polarized light transmitted through the first polarizer POL1 is located at 90° azimuth. Therefore, the display image can be seen even when the display device DSP is observed through polarizing sunglasses.

FIG. 4 is a diagram illustrating a structural example of the viewing angle control panel 1. In this example, illustrated is an alignment state of the liquid crystal molecules LM2 in an off time where no voltage is applied to the second liquid crystal layer LC2 between the alignment films AL3 and AL4.

The alignment treatment direction AD4 of the alignment film AL4 is substantially orthogonal to the alignment treatment direction AD3 of the alignment film AL3. Note that the alignment treatment may be a rubbing treatment or a photo-alignment treatment. However, in consideration of driving the liquid crystal molecules LM2 uniformly and smoothly when voltage is applied to the second liquid crystal layer LC2, it is desirable that the liquid crystal molecules LMA in the vicinity of the alignment film AL4 and the liquid crystal molecules LMB in the vicinity of the alignment film AL3 have a relatively large pretilt angle, and in order to achieve that, the rubbing treatment is suitable for the alignment treatment. Furthermore, if the liquid crystal molecules LMA and LMB in the off time are controlled to have a relatively large pretilt angle, photo-alignment treatment may be applied.

In the structural example of FIG. 4, the alignment treatment direction AD4 is substantially parallel to the fourth transmission axis T4, and the alignment treatment direction AD3 is substantially parallel to the third transmission axis T3. That is, the alignment treatment direction AD4 is located at 135° azimuth and the alignment treatment direction AD3 is located at 45° azimuth. In the second liquid crystal layer LC2, liquid crystal molecules LM2 aligned along the third direction Z are in the twisted alignment. A chiral agent is added to the second liquid crystal layer LC2, and the liquid crystal molecules LM2 are configured to be twisted aligned counterclockwise from the fourth substrate SUB4 to the third substrate SUB 3.

The liquid crystal molecules LMA in the side close to the fourth polarizer POL4 and the fourth substrate SUB4 are aligned in the azimuth along the fourth transmission axis T4. Or, the liquid crystal molecules LMA are aligned such that the major axis thereof is along the alignment treatment direction AD4. That is, the liquid crystal molecules LMA are aligned azimuthally at 135°. Moreover, the liquid crystal molecules LMA are inclined such that the tip end of the arrow indicating the alignment treatment direction AD4 is apart away from the fourth substrate SUB4.

The liquid crystal molecules LMB in the side close to the third polarizer POL3 and the third substrate SUB3 are aligned to the azimuth along the third transmission axis T3. Or, the liquid crystal molecules LMB are aligned such that the major axis thereof is along the alignment treatment direction AD3. That is, the liquid crystal molecules LMB are aligned azimuthally at 45°. Moreover, the liquid crystal molecules LMB are inclined such that the tip end of the arrow indicating the alignment treatment direction AD3 is apart away from the third substrate SUB3 (or inclined such that the rear end of the arrow indicating the alignment treatment direction AD3 becomes closer to the third substrate SUB3).

Liquid crystal molecules LMC located in substantially the middle of the third direction (thickness direction) Z of the second liquid crystal layer LC2 are aligned such that the major axis thereof is along the first direction X. The major axis of the liquid crystal molecule LMC is substantially parallel to the first absorption axis A1 of the first polarizer POL1 of FIG. 3.

Note that, at least one of the arrows indicating the alignment treatment direction AD3 and the alignment treatment direction AD4 may be in the opposite direction. In addition, the alignment treatment direction AD4 and the fourth transmission axis T4 may be located at 45° azimuth, and the alignment treatment direction AD3 and the third transmission axis T3 may be located at 135° azimuth. Furthermore, the liquid crystal molecules LM2 aligned in the third direction Z may be twisted aligned clockwise as long as the liquid crystal molecules LMC are aligned along the first direction X.

In the above structural example, the case where the illumination light emitted from illumination device IL is natural light is described, but if the illumination light is linearly polarized light with a polarizing axis nearly parallel to the alignment treatment direction AD4, the fourth polarizer POL4 may be omitted. Furthermore, a reflective polarization film that transmits a specific linear polarization (e.g., p-wave) of the illumination light, which is natural light, while reflecting other linear polarizations (e.g., s-wave) may be provided. When the illumination light is linearly polarized light having a polarizing axis different from the alignment treatment direction AD4, a half-wave retardation film similar to the polarizing axis rotation element 100 is preferred instead of the fourth polarizer POL4. Furthermore, if the light transmitted through the viewing angle control panel 1 is linearly polarized light with the same polarization as the second polarization component, the third polarizer POL3 may be omitted.

FIG. 5 illustrates the alignment states of liquid crystal molecules LM2.

Part (A) of FIG. 5 illustrates the alignment state of the liquid crystal molecules LM2 in the off time when no voltage is applied to the second liquid crystal layer LC2. The long axis LX of the liquid crystal molecule LMC is parallel to the first direction X, and is also approximately parallel to the X-Y plane. As explained with reference to FIG. 4, etc., if the fourth polarizer POL4 and the third polarizer POL3 which sandwich the viewing angle control panel 1 are arranged in a cross-nicole relationship, maximum transmittance is obtained in the off time.

Part (B) of FIG. 5 shows an alignment state of the liquid crystal molecules LM2 when the voltage is applied to the second liquid crystal layer LC2 at the on time. As the voltage applied to the second liquid crystal layer LC2 increases, the transmittance decreases. If the voltage applied to the second liquid crystal layer LC2 when the minimum transmittance is obtained is the maximum voltage, part (B) of FIG. 5 illustrates the alignment state where a voltage about half the maximum voltage is applied to the second liquid crystal layer LC2. At that time, the long axis LX of the liquid crystal molecules LMC is parallel to the first direction X, and the long axis LX is inclined with respect to the X-Y plane.

The viewing angle control panel in the on time has asymmetric transmissivities between a case where the observation position is tilted toward the right side of the figure with respect to the third direction Z (toward the tip of the arrow pointing in the first direction X), and a case where the observation position is tilted toward the left side of the figure with respect to the third direction Z (rear end of the arrow indicating the first direction X). This point will be explained below.

FIG. 6 is a diagram illustrating viewing angle characteristics of the viewing angle control panel 1 in the alignment state of part (B) of FIG. 5. The viewing angle characteristics shown here correspond to results of simulation under the following conditions. The conditions are as follows: the illumination light from illumination device IL is natural light; the viewing angle control panel 1 is held between the third polarizer POL3 and the fourth polarizer POL4; the first polarizer POL1, the second polarizer POL2, and the display panel PNL are not provided; and the drive voltage of the second liquid crystal layer LC2 is 2.5 V and the wavelength of transmitted light is 550 nm.

The azimuth of 0° in the figure corresponds to the tip end of the arrow in the first direction X above, the azimuth of 180° corresponds to the rear end of the arrow in the first direction X, the azimuth of 90° corresponds to the tip end of the arrow in the second direction Y, and the azimuth of 270° corresponds to the rear end of the arrow in the second direction Y. The center of the concentric circles corresponds to the normal direction (the third direction) of the viewing angle control panel 1, and the concentric circles centered on the normal direction corresponds to inclination angles of 20°, 40°, 60°, and 80°, with respect to the normal direction, respectively. The characteristic diagram shown here was obtained by connecting regions of equal transmittance for each azimuth.

As in the figure, relatively high transmittance is obtained when the observation position is inclined at 0° azimuth, whereas the transmittance sharply decreases when the observation position is inclined at 180° azimuth, and when the tilt angle exceeds 30°, transmittance is 3% or less.

Figure 7:
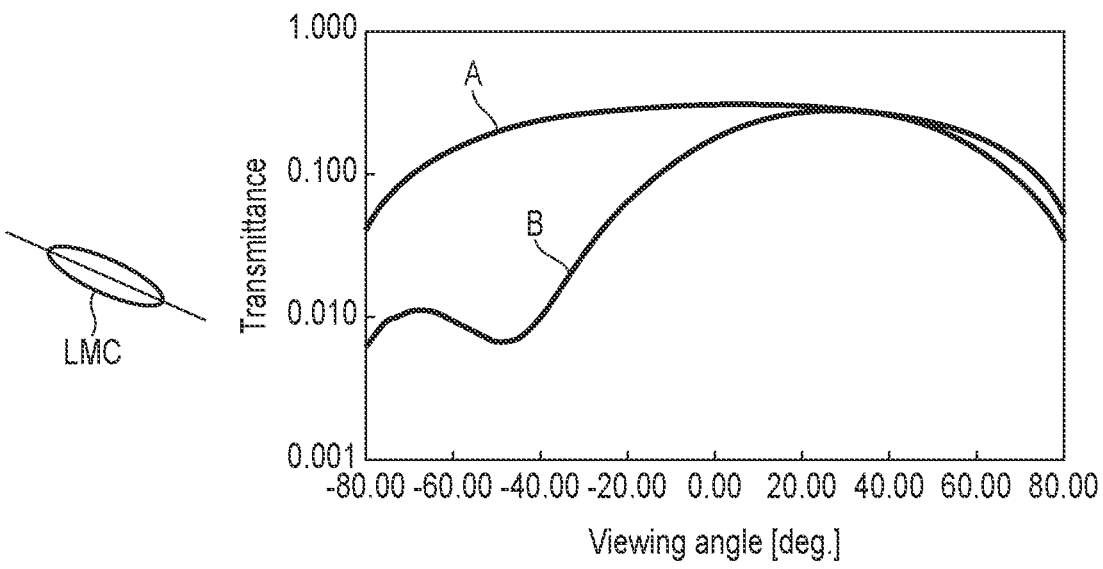
FIG. 7 is a diagram illustrating viewing angle characteristics of on/off time of the viewing angle control panel 1.

FIG. 7 is a diagram illustrating the viewing angle characteristics of on/off time of the viewing angle control panel 1. The horizontal axis of the figure shows the viewing angle along the 0°-180° azimuth of FIG. 6, with 0° azimuth as positive angle, and 180° azimuth as negative angle. The vertical axis of the figure shows transmittance.

A in the figure corresponds to the viewing angle characteristics in the off time (alignment state shown in part (A) of FIG. 5). In the off time, almost symmetrical transmittance is obtained even when the observation position is tilted to the left side of the figure or to the right side of the figure, and the transmittance of about 25% or more is obtained over a range of −40° to +40°.

B in the figure corresponds to the viewing angle characteristics in the on time (alignment state shown in part (B) of FIG. 5). In the on time, when the observation position is tilted to the right side of the figure, transmittance of about 20% or more is obtained over the range of 0° to +50°. On the other hand, when the observation position is tilted to the left side of the figure, the transmittance is about 3% or less in the range of 30° or more, and about 1% or less in the range of 40° or more in which the light is almost completely blocked. In the present embodiment, the viewing angle of the display device DSP is controlled by using the viewing angle control panel 1 with the viewing angle characteristics described above.

Figure 8:
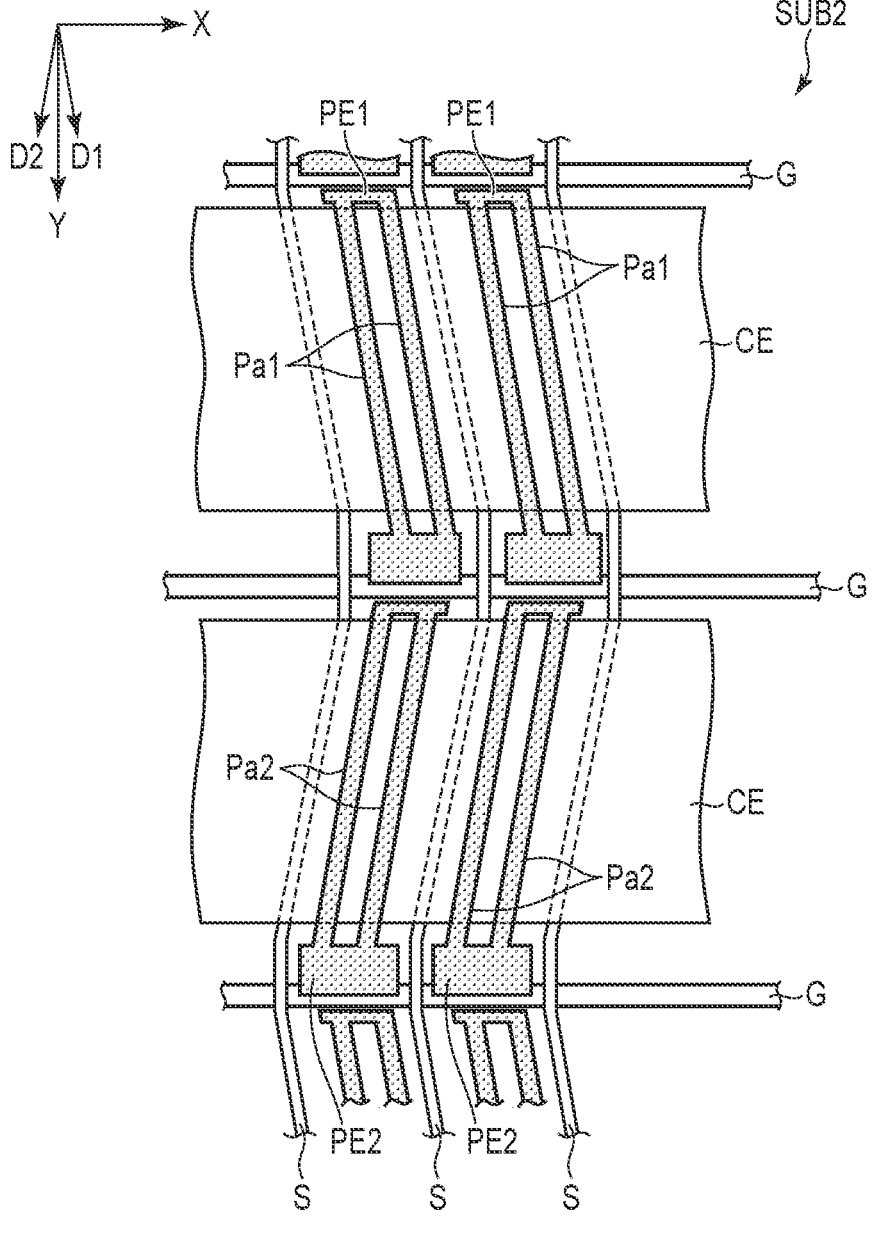
FIG. 8 is a plan view illustrating an example of the pixel layout of the display panel PNL.

FIG. 8 is a plan view illustrating an example of a pixel layout of the display panel PNL. Here, only the structures necessary for explanation are illustrated. The second substrate SUB2 includes a plurality of scanning lines G, and a plurality of signal lines S. The plurality of scanning lines G each extend linearly along the first direction X, and are spaced apart in the second direction Y. The signal lines S each extend generally in the second direction Y and are spaced apart in the first direction X.

The pixel electrodes PE1 are aligned along the first direction X. The pixel electrode PE1 has a strip-shaped electrode Pa1 overlapped the common electrode CE. The strip-shaped electrode Pa1 extends along a direction D1 which is different from the first direction X and the second direction Y. The pixel electrodes PE2 are aligned along the first direction X. The pixel electrode PE2 has a strip-shaped electrode Pa2 overlapped the common electrode CE. The strip-shaped electrode Pa2 extends along a direction D2 different from the direction D1. The number of strip-shaped electrodes Pa1 and Pa2 may be one, or three or more.

FIG. 9 is a diagram illustrating a structural example of the display panel PNL. In this example, an alignment state of the liquid crystal molecules LM1 in the off time where no voltage is applied to the first liquid crystal layer LC1 between the alignment films AL1 and AL2 is illustrated.

The alignment treatment direction AD1 of the alignment film AL1 and the alignment treatment direction AD2 of the alignment film AL2 are substantially parallel and opposite to each other. The alignment treatment direction AD1 and the alignment treatment direction AD2 are, for example, parallel to the first transmission axis T1. That is, the tip of the arrow pointing in the alignment treatment direction AD2 is located at 90° azimuth, and the tip of the arrow pointing in the alignment treatment direction AD1 is located at 180° azimuth. In the first liquid crystal layer LC1, liquid crystal molecules LM1 aligned along the third direction Z are homogeneously aligned. The liquid crystal molecules LM1 are aligned such that the major axis thereof is along the second direction Y.

Note that, if the light transmitted through the polarizing axis rotation element 100 is linearly polarized light with the same polarization intensity as the first polarization component, the second polarizer POL2 may be omitted. In addition, the alignment treatment direction AD1 and the alignment treatment direction AD2 may be approximately orthogonal to the first transmission axis T1. Furthermore, the second transmission axis T2 may be located at 90° azimuth and the first transmission axis T1 may be located at 0° azimuth, but as described above, in consideration of viewing the displayed image through polarized sunglasses, as illustrated, the first transmission axis T1 is desired to be located at 90° azimuth and the second transmission axis T2 is desired to be located at 0° azimuth.

Next, another structural example will be described.

Figure 10:
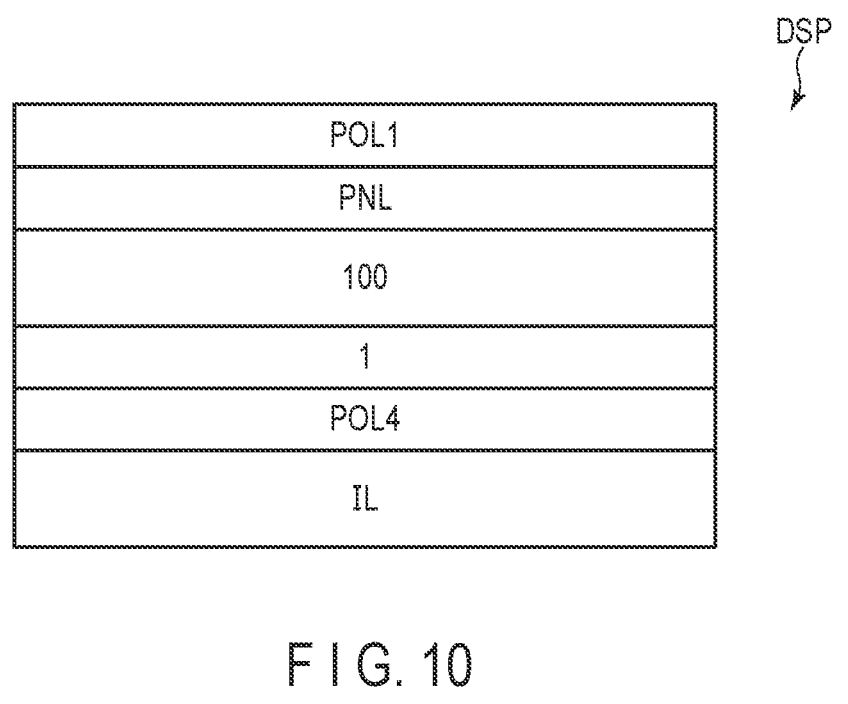

FIG. 10 is a diagram illustrating another structural example of the display device DSP of the embodiment. Compared to the structural example shown in FIG. 1, the structural example shown in FIG. 10 omits the second polarizer POL2 and the third polarizer POL3. Note that, relationships between the fourth transmission axis T4 of the fourth polarizer POL4, phase advance axis F of the polarizing axis rotation element 100, and first transmission axis T1 of the polarizer POL1 are the same as described with reference to FIG. 3.

Note that, as described above with reference to FIG. 4, when the illumination light is natural light, instead of the fourth polarizer POL4, a reflective polarizing film which transmits specific linearly polarized light (e.g., p-wave) and reflects other linearly polarized light (e.g., s-wave) and a half-wave retardation film may be provided such that the polarizing axis of the linearly polarized light transmitted through the reflective polarizing film is aligned with the azimuth of the alignment treatment direction AD4 of the viewing angle control panel 1.

FIG. 11 is a diagram illustrating viewing angle characteristics of the viewing angle control panel 1 in the on time in the display device DSP of FIG. 10. As in the figure, relatively high transmittance is obtained when the observation position is tilted to 0° azimuth, whereas the transmittance sharply decreases when the observation position is tilted to 180° azimuth, and when the tilt angle exceeds 30°, transmittance is 7% or less.

FIG. 12 is a diagram illustrating viewing angle characteristics of on/off time of the viewing angle control panel 1. C in the figure corresponds to the viewing angle characteristics in the on time. In the on time, when the observation position is tilted to the right in the figure, transmittance of approximately 30% or more is obtained over the range of 0° to +50°. On the other hand, when the observation position is tilted to the left side of the figure, the transmittance is less than about 7% in the range of 30° or more and about 1% in the range of 40° or more, by which the light is almost completely blocked.

The structural example of FIG. 10 also achieves the same effects as the above structural example. In addition, the number of parts for optical elements is reduced, resulting in cost reduction.

FIG. 13 is a diagram illustrating another structural example of the display device DSP of the embodiment. Compared to the structural example of FIG. 1, the structural example of FIG. 13 adds, between the illumination device IL and the fourth polarizer POL4, a viewing angle control panel 2, fifth polarizer POL5, and sixth polarizer POL6. The fifth polarizer POL5 is disposed between the viewing angle control panel 2 and the fourth polarizer POL4. The sixth polarizer POL6 is disposed on the rear side of the viewing angle control panel 2 (or between the illumination device IL and the viewing angle control panel 2).

The viewing angle control panel 2 is a liquid crystal panel similar to the viewing angle control panel 1. Note that, the viewing angle control panel 2 has a different liquid crystal panel preparation condition or different drive voltage for the liquid crystal layer, as compared to the viewing angle control panel 1. When the drive voltages of the viewing angle control panel 1 and viewing angle control panel 2 are different, the angular range of the viewing angle that can limit visibility can be expanded compared to the above structural example. By differing the retardation ($\Delta n \cdot d$) in the liquid crystal layer of each of the viewing angle control panels 1 and 2, the changing amount of luminosity can be adjusted between a case where the observation is made from the front and a case where the observation is made from an oblique angle (note that $\Delta n$ is the refractive index anisotropy of the liquid crystal layer, and d is the thickness of the liquid crystal layer). Furthermore, the viewing angle control panel 1 and the viewing angle control panel 2 may not be driven at the same time, and one of the viewing angle control panel 1 and the viewing angle control panel 2 may be driven according to the angular range of the viewing angle to be limited.

FIG. 14 is a diagram illustrating a structural example of the viewing angle control panel 2. The viewing angle control panel 2 includes a fifth substrate SUB5 with an alignment film AL5, sixth substrate SUB6 with an alignment film AL6, and third liquid crystal layer LC3. Although this is not shown in the figure, each of the fifth substrate SUB5 and the sixth substrate SUB6 includes a transparent electrode for applying voltage to the third liquid crystal layer LC3.

FIG. 14 illustrates an alignment state of the liquid crystal molecules LM3 in the off time where no voltage is applied to the third liquid crystal layer LC3 between the alignment film AL5 and the alignment film AL6.

The fifth transmission axis T5 of the fifth polarizer POL5 is substantially parallel to the fourth transmission axis T4 of the fourth polarizer POL4, and is located at 135° azimuth. The sixth transmission axis T6 of the sixth polarizer POL6 is substantially orthogonal to the fifth transmission axis T5, and is located at 45° azimuth.

The alignment treatment direction AD6 of the alignment film AL6 is substantially orthogonal to the alignment treatment direction AD5 of the alignment film AL5. The alignment treatment direction AD5 is substantially parallel to the fifth transmission axis T5 and is located at 135° azimuth. The alignment treatment direction AD6 is substantially parallel to the sixth transmission axis T6, and is located at 45° azimuth. In the third liquid crystal layer LC3, liquid crystal molecules LM3 aligned along the third direction Z are twisted aligned. The liquid crystal molecules LM3 are aligned in the twisted alignment from the sixth substrate SUB6 to the fifth substrate SUB5 clockwise. The liquid crystal molecules LM3 in substantially the middle of the third direction (thickness direction) Z of the third liquid crystal layer LC3 are aligned such that the major axis thereof is along the first direction X.

Note that, the axis angle of each optical element is not limited to the above structural examples.

FIG. 15 is a diagram illustrating an application example of the display device DSP. The display device DSP of FIG. 15 corresponds to a vehicle-use display device installed in a vehicle 200. The display device DSP is located in front of the driver's seat and the passenger seat. In the illustrated example, the display device DSP is located approximately in front of the front passenger seat and diagonally forward to the left as seen from the driver's seat. Note that the driver's seat and the passenger seat are assumed to be aligned in the first direction X described in each of the structural examples above. However, if such a display device DSP is configured as the structural example shown in FIG. 1, the 0° azimuth shown in FIG. 6 (or −80° azimuth in FIG. 7) corresponds to the azimuth of the passenger seat side, and the 180° azimuth shown in FIG. 6 (or +80° azimuth in FIG. 7) corresponds to the azimuth on the driver's seat side.

The passenger in the passenger seat will observe the display device DSP from almost the front. At this time, the transmittance of viewing angle control panel 1 is the transmittance around the viewing angle of 0° as in FIG. 7. That is, the passenger can see the image displayed in the display panel PNL both when the viewing angle control panel 1 is off (A in the figure) and on (B in the figure).

On the other hand, the driver in the driver seat will observe the display device DSP from an oblique direction. In that case, the transmittance of viewing angle control panel 1 is the transmittance around −80° to −40°. That is, the driver can see the image displayed on the display panel PNL when the viewing angle control panel 1 is off, but cannot see the image displayed on the display panel PNL when the viewing angle control panel 1 is on because the light is almost completely blocked.

As above, the viewing angles of driver and passenger with different observation positions with respect to the display device DSP can be controlled.

Incidentally, a display part DAR in the right side of the display device DSP as seen from the driver's seat is closer to the driver's seat as compared to a display part DAL in the left side of the display device DSP. As in the figure, when the driver observes the display device DSP, the viewing angle θR when observing the display part DAR is smaller than the viewing angle θL when observing the display part DAL.

The viewing angle control panel 1 includes a control area AR overlapping with the display part DAR and a control area AL overlapping with the display part DAL.

As explained with reference to FIG. 7, the transmittance of the viewing angle control panel 1 tends to be higher when the viewing angle θ is closer to 0° at the on time. Furthermore, the twisted nematic liquid crystal element has a characteristic that when the drive voltage of the liquid crystal layer becomes higher, the transmittance becomes lower. Therefore, in order to make both display areas DAR and DAL light-shielding, the drive voltage of the liquid crystal layer in the control area AR is desired to be set higher than the drive voltage of the liquid crystal layer in the control area AL.

FIG. 16 is a diagram illustrating a structural example of the viewing angle control panel 1 applicable to the display device DSP of FIG. 15.

The viewing angle control panel 1 includes a plurality of first transparent electrodes TE1 including first transparent electrodes TE1L and TE1R, and a second transparent electrode TE2. The first transparent electrodes TE1 are aligned in the first direction X. The first transparent electrode TE1L is disposed in one end side of the viewing angle control panel 1 (side close to the passenger seat) and overlaps with the display part DAL. The first transparent electrode TE1R is disposed at the other end side of the viewing angle control panel 1 (side close to the driver's seat) and overlaps with the display area DAR. The second transparent electrode TE2 faces first transparent electrodes TE1 in the third direction Z. As explained with reference to FIG. 2, the second liquid crystal layer LC2 is disposed between the first transparent electrodes TE1 and the second transparent electrode TE2.

The applied voltage of the first transparent electrode TE1R with respect to the potential of the second transparent electrode TE2 is higher than that of the first transparent electrode TE1L. That is, the drive voltage of the second liquid crystal layer LC2 overlapping with the first transparent electrode TE1R is higher than that of the second liquid crystal layer LC2 overlapping the first transparent electrode TE1L. Furthermore, the applied voltages of the first transparent electrodes TE1 aligned in the first direction X are controlled such that they each gradually increase from the first transparent electrode TE1L to the first transparent electrode TE1R.

Therefore, a light-shielding condition is formed in both the display part DAR close to the driver's seat and the display part DAL distant from the driver's seat, and the driver will not be able to see the display image over the entire display device DSP.

As explained above, according to the present embodiment, a display device and a vehicle-use display device which can control the viewing angle can be achieved.

Note that the present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A vehicle-use display device arranged in front of a passenger seat comprising:
   an illumination device emitting an illumination light;
   a display panel;
   a viewing angle control panel disposed between the illumination device and the display panel; and
   a polarizing axis rotation element disposed between the viewing angle control panel and the display panel, wherein
   the display panel includes a first liquid crystal layer which modulates a first polarization component,
   the viewing angle control panel includes a plurality of first transparent electrodes aligned in a first direction and a second transparent electrode opposed to the first transparent electrodes, a second liquid crystal layer disposed between the first transparent electrodes and the second transparent electrode and containing twist-aligned liquid crystal molecules,
   those of the liquid crystal molecules located in an approximate center of the second liquid crystal layer along a thickness direction thereof are aligned such that the long axis thereof is along the first direction,
   a second polarizing axis of a second polarization component transmitted through the viewing angle control panel is different from a first polarizing axis of the first polarization component,
   the polarizing axis rotation element rotates the second polarizing axis such that the second polarizing axis is aligned with the first polarizing axis,
   the plurality of first transparent electrodes are each rectangular in shape and aligned in the first direction,
   when no voltage is applied to the second liquid crystal layer, the viewing angle control panel transmits light symmetrically to positive and negative viewing angles relative to the normal direction of the viewing angle control panel,

when the voltage is applied to the second liquid crystal layer, the viewing angle control panel transmits less light to the negative viewing angle than to the positive viewing angle, and a transmittance at the negative viewing angle is smaller than the transmittance at the positive viewing angle at positions where magnitudes of the positive and negative viewing angles are equal each other,
   the first transparent electrodes include a third transparent electrode close to a driver's seat that is aligned with the passenger seat in the first direction and a fourth transparent electrode close to the passenger seat,
   the first transparent electrodes aligned in the first direction are applied with voltages such that the voltages gradually increase from the fourth transparent electrode to the third transparent electrode,
   when the viewing angle control panel is in an off time, when an observation position is tilted to a left side or to a right side, a transmittance of 25% or more is obtained over a range of −40° to +40°, and
   when the viewing angle control panel is in an on time, when the observation position is tilted to one of the right side and the left side, the transmittance of 20% or more is obtained over a range of 0° to +50°, while when the observation position is tilted to the other side of the one of the right side and the left side, the transmittance is 3% or less in a range of 30° or more, and 1% or less in a range of 40° or more.

2. The vehicle-use display device according to claim 1, wherein
   the polarizing axis rotation element is configured such that a phase difference of ½ wavelength is applied to the second polarization component, and has a phase advance axis in an azimuth midway between an azimuth of the first polarizing axis and an azimuth of the second polarizing axis.

3. The vehicle-use display device according to claim 1, further comprising:
   a first polarizer disposed on a front surface side of the display panel, wherein
   the first polarizer includes a first absorption axis along the first direction, and
   those of the liquid crystal molecules located in an approximate center of the second liquid crystal layer along a thickness direction thereof are aligned such that the long axis thereof is along the first direction.

4. The vehicle-use display device according to claim 1, further comprising:
   a second polarizer disposed between the polarizing axis rotation element and the display panel; and
   a third polarizer disposed between the viewing angle control panel and the polarizing axis rotation element, wherein
   the second polarizer includes a second transmission axis transmitting the first polarization component,
   the third polarizer includes a third transmission axis transmitting the second polarization component, and
   the polarizing axis rotation element includes a phase advance axis in an azimuth midway between an azimuth of the second transmission axis and an azimuth of the third transmission axis.

5. The vehicle-use display device according to claim 4, further comprising:
   a fourth polarizer disposed on a rear surface side of the viewing angle control panel, wherein the fourth polarizer includes a fourth transmission axis which is substantially orthogonal to the third transmission axis, and among the liquid crystal molecules of the second liquid crystal layer, those of the liquid crystal molecules, close to the fourth polarizer are aligned in the azimuth along the fourth transmission axis, and those of the liquid crystal molecules, close to the third polarizer are aligned in the azimuth along the third transmission axis.

6. The vehicle-use display device according to claim 5, wherein the liquid crystal molecules close to the fourth polarizer are aligned in the azimuth of 135° counterclockwise with respect to a first direction, and the liquid crystal molecules close to the third polarizer are aligned in the azimuth of 45° counterclockwise with respect to the first direction.

7. The vehicle-use display device according to claim 1, wherein the display panel includes a plurality of pixel electrodes overlapping the plurality of first transparent electrodes and a common electrode opposing the pixel electrodes.

8. The vehicle-use display device according to claim 1, further comprising:

a reflective polarization film which transmits p-wave of the illumination light while reflects s-wave of the illumination light.

\* \* \* \* \*